(12) United States Patent
Watanabe et al.

(10) Patent No.: US 11,095,219 B2
(45) Date of Patent: Aug. 17, 2021

(54) CONVERTER WITH SOFT SWITCHING FUNCTION

(71) Applicant: DIAMOND ELECTRIC MFG. CO., LTD., Osaka (JP)

(72) Inventors: Masao Watanabe, Osaka (JP); Shogo Nakahara, Osaka (JP)

(73) Assignee: DIAMOND ELECTRIC MFG. CO., LTD., Osaka (JP)

(*) Notice: Subject to any disclaimer, the term of this patent is extended or adjusted under 35 U.S.C. 154(b) by 0 days.

(21) Appl. No.: 16/638,370

(22) PCT Filed: Aug. 22, 2018

(86) PCT No.: PCT/JP2018/030908
§ 371 (c)(1),
(2) Date: Feb. 11, 2020

(87) PCT Pub. No.: WO2019/039489
PCT Pub. Date: Feb. 28, 2019

(65) Prior Publication Data
US 2020/0366198 A1 Nov. 19, 2020

(30) Foreign Application Priority Data
Aug. 22, 2017 (JP) .............................. JP2017-159269

(51) Int. Cl.
*H02M 3/158* (2006.01)
*H02M 3/335* (2006.01)
*H02M 1/00* (2006.01)

(52) U.S. Cl.
CPC ....... *H02M 3/158* (2013.01); *H02M 3/33546* (2013.01); *H02M 3/33584* (2013.01); *H02M 1/0058* (2021.05)

(58) Field of Classification Search
CPC ..... H02M 3/33584; H02M 2001/0054; H02M 2001/0048; H02M 2001/0058;
(Continued)

(56) References Cited

U.S. PATENT DOCUMENTS

| 7,848,118 B2* | 12/2010 | Shimada | ................. H02M 1/32 363/17 |
| 2007/0070655 A1* | 3/2007 | Eguchi | .................... H02M 1/40 363/17 |

(Continued)

FOREIGN PATENT DOCUMENTS

| JP | 2013-027201 A | 2/2013 |
| JP | 2014-230369 A | 12/2014 |
| JP | 2016-012970 A | 1/2016 |

OTHER PUBLICATIONS

International Search Report issued in corresponding International Patent Application No. PCT/JP2018/030908, dated Oct. 30, 2018, with English translation.

*Primary Examiner* — Rafael O Leon De Domenech
(74) *Attorney, Agent, or Firm* — McDermott Will & Emery LLP (57) ABSTRACT

A DC-DC converter has a configuration in which a first full-bridge circuit and a second full-bridge circuit are connected via a transformer and an inductor. A control circuit switches between first control for changing the phases of switching elements in the first bridge circuit and switching elements in the second bridge circuit and second control for changing the switching frequencies (drive angular frequencies) of the switching elements, in accordance with target power, so that an inductor current flowing during a dead time of the switching elements becomes larger than or equal to a threshold current. The inductor current in the first control is larger than the inductor current in the second control.

10 Claims, 9 Drawing Sheets

(58) Field of Classification Search
CPC ........ H02M 1/06; H02M 1/083; H02M 1/084; H02M 1/088; H02M 3/337; H02M 3/3376
See application file for complete search history.

(56) References Cited

U.S. PATENT DOCUMENTS

| | | | |
|---|---|---|---|
| 2011/0249472 A1* | 10/2011 | Jain | H02M 3/3376 363/15 |
| 2013/0314950 A1* | 11/2013 | Hembach | H02M 3/33592 363/17 |
| 2014/0334189 A1* | 11/2014 | Yan | H02M 3/33584 363/17 |
| 2014/0347889 A1 | 11/2014 | Muto | |
| 2016/0190944 A1* | 6/2016 | Uchihara | H02M 3/33546 363/17 |
| 2016/0365803 A1* | 12/2016 | Torrico-Bascope | H02M 1/15 |
| 2017/0063251 A1* | 3/2017 | Ye | H02M 3/33576 |
| 2017/0324347 A1* | 11/2017 | Xu | H02M 3/33584 |
| 2019/0052178 A1* | 2/2019 | Ishikura | H02M 3/28 |
| 2020/0274457 A1* | 8/2020 | Kajiyama | H02M 1/083 |
| 2020/0366184 A1* | 11/2020 | Watanabe | H02M 3/33576 |

* cited by examiner

CONVERTER WITH SOFT SWITCHING FUNCTION

CROSS REFERENCE TO RELATED APPLICATIONS

This application is the U.S. National Phase under 35 U.S.C. § 371 of International Application No. PCT/JP2018/030908 filed on Aug. 22, 2018, which claims the benefit of Japanese Application No. 2017-159269, filed on Aug. 22, 2017, the entire contents of each are hereby incorporated by reference.

BACKGROUND OF THE INVENTION

Field of the Invention

The present invention relates to a converter that performs soft switching.

Description of the Background Art

Power converters such as DC-DC converters employ zero voltage switching (hereinafter, referred to as ZVS) in order to reduce switching losses and achieve high-efficiency power transfer or in order to reduce noise and suppress switching surges so as to enable the use of low-cost, low withstand voltage devices. Japanese Patent Application Laid-Open No. 2016-012970 (Patent Document 1) discloses a DC-DC converter capable of high-efficiency power transfer by implementing ZVS operations when a large voltage difference occurs between a primary direct-current voltage and a secondary direct-current voltage. The DC-DC converter described in Patent Document 1 detects power on each of primary and secondary sides and increases or decreases the duties of primary switches and the duties of secondary switches so as to minimize a power difference between the two sides. Accordingly, ZVS operations are accomplished.

In Patent Document 1, the duties of the primary and secondary switches are controlled. In this case, if on-duty time is short, it may not be possible to pass a sufficient current to accomplish ZVS. On the other hand, if the duties are changed in order to pass a sufficient current, target output power may not be obtained. This can result in narrowing of the area where ZVS can be performed, an increase in switching losses due to incapability of performing ZVS, and a reduction in the efficiency of power transfer.

SUMMARY OF THE INVENTION

It is an object of the present invention to provide a converter capable of enlarging the area where ZVS can be performed and performing ZVS operations so as to reduce switching losses.

A converter according to a first aspect of the present invention includes a first full-bridge circuit including four switching elements, each including either a capacitor that is a parasitic capacitance or external capacitors connected in parallel, a second full-bridge circuit including four switching elements, each including either a capacitor that is a parasitic capacitance or external capacitors connected in parallel, a transformer including a first winding connected to the first full-bridge circuit and a second winding coupled magnetically to the first winding and connected to the second full-bridge circuit, an inductance component connected in series with the first or second winding, and a control circuit that performs soft switching control of each of the first full-bridge circuit and the second full-bridge circuit to cause output power to follow a command value. The control circuit switches between first control for changing phases of a voltage on a first winding side and a voltage on a second winding side and second control for changing drive angular frequencies of the voltage on the first winding side and the voltage on the second winding side, on the basis of a target value obtained in a process of the following, so that an inductor current flowing through an equivalent inductor that is equivalent to the transformer and the inductance component becomes larger than or equal to a threshold current at a timing of switching between turn-on and turn-off of each switching element.

According to a second aspect of the present invention, in the converter of the first aspect, the first full-bridge circuit includes a first leg in which a first switching element and a second switching element are connected in series, and a second leg in which a third switching element and a fourth switching element are connected in series, the second full-bridge circuit includes a third leg in which a fifth switching element and a sixth switching element are connected in series, and a fourth leg in which a seventh switching element and an eighth switching element are connected in series, and in the first control, the control circuit changes phases of a drive signal for the first to fourth switching elements and a drive signal for the fifth to eighth switching elements, and in the second control, the control circuit changes switching frequencies of the first to eighth switching elements.

According to a third aspect of the present invention, in the converter of the first or second aspect, a time difference that corresponds to a phase difference between the voltage on the first winding side and the voltage on the second winding side satisfies the following expression:

$$td = \delta/\omega$$

where td is the time difference, $\delta$ is the phase difference, and $\omega$ is the drive angular frequency.

According to a fourth aspect of the present invention, in the converter of the third aspect, the time difference td is constant in the second control.

According to a fifth aspect of the present invention, in the converter of the first to fourth aspects, the first full-bridge circuit is connected to a first direct-current power supply, the second full-bridge circuit is connected to a second direct-current power supply, and the following expression is satisfied:

$$\omega = \pi/td(1-(P_T \cdot L)/(n \cdot Vx \cdot Vy \cdot td))$$

where $P_T$ is the target value, $\omega$ is the switching frequency, Vx is a power supply voltage of the first direct-current power supply, Vy is a power supply voltage of the second direct-current power supply, L is an inductance of the equivalent inductor, td is the time difference, and n is a turns ratio of the transformer.

According to a sixth aspect of the present invention, the converter of the first to fifth aspects is a converter that includes a first bridge circuit including a first leg in which a first switching element and a second switching element are connected in series and a second leg in which a third switching element and a fourth switching element are connected in series, each of the first to fourth switching elements including either a capacitor that is a parasitic capacitance or four external capacitors connected in parallel, a second bridge circuit including a third leg in which a fifth switching element and a sixth switching element are connected in series and a fourth leg in which a seventh switching element and an eighth switching element are connected in series, each of the fifth to eighth switching elements including either a capacitor that is a parasitic capacitance or four external capacitors connected in parallel, a transformer including a first winding connected to a midpoint of each of the first and second legs, and a second winding coupled magnetically to the first winding and connected to a midpoint of each of the third and fourth legs, an inductance component connected in series with the first or second winding, and a control circuit that performs soft switching control of the first to eighth switching elements to cause output power to follow a command value. The control circuit switches between first control and third control for execution, the first control being control for changing phases of a drive signal for the first to fourth switching elements and a drive signal for the fifth to eighth switching elements, on the basis of a target value obtained in a process of the following, so that an inductor current flowing through an equivalent inductor that is equivalent to the transformer and the inductance component becomes larger than or equal to a threshold current at a timing of switching between turn-on and turn-off of each switching element, and the third control being control for changing a phase difference between a drive signal for the first and second switching elements and a drive signal for the third and fourth switching elements, or changing a phase difference between a drive signal for the fifth and sixth switching elements and a drive signal for the seventh and eighth switching elements.

According to the first to sixth aspects of the present invention, it is possible to enlarge the area where ZVS can be performed, by switching control depending on the target power. In particular, according to the first to sixth aspects, heat generation in the transformer or magnetic saturation, caused by a change in frequency, can be suppressed by performing the first control in the area where there is no need to change the frequencies.

These and other objects, features, aspects and advantages of the present invention will become more apparent from the following detailed description of the present invention when taken in conjunction with the accompanying drawings.

DESCRIPTION OF PREFERRED EMBODIMENTS

Embodiments of the present invention will be described hereinafter with reference to the drawings. In the following description, a DC-DC converter is given as an example of the converter according to the present invention.

1. Circuit Configuration of DC-DC Converter

Figure 1:
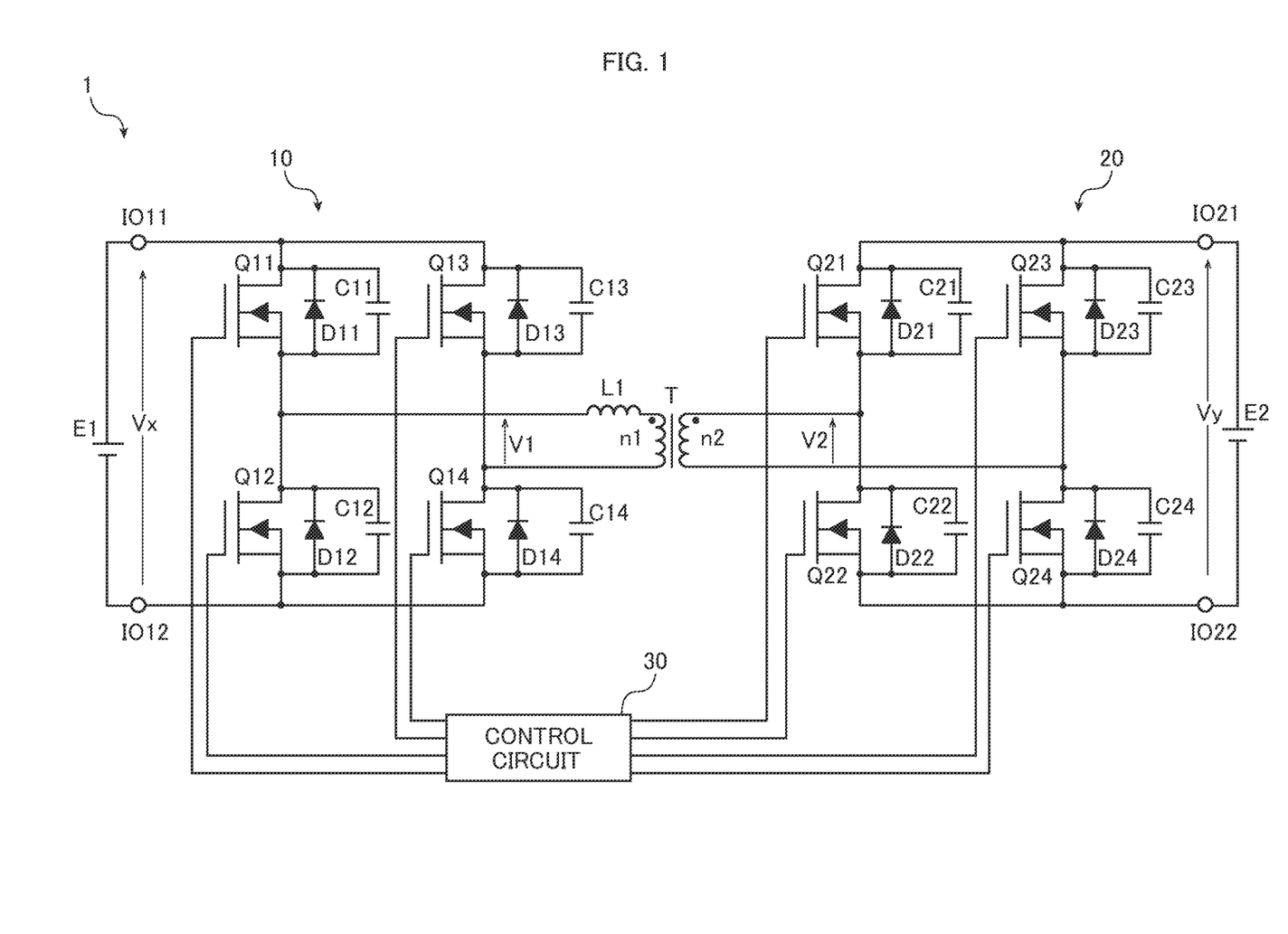
FIG. 1 is a circuit diagram of a DC-DC converter according to an embodiment.

FIG. 1 is a circuit diagram of a DC-DC converter 1 according to an embodiment of the present invention.

The DC-DC converter 1 includes a pair of input/output terminals IO11 and IO12 and a pair of input/output terminals IO21 and IO22. The input/output terminals IO11 and IO12 are connected to a direct-current (DC) power supply E1. The input/output terminals IO21 and IO22 are connected to a DC power supply E2. The DC-DC converter 1 transforms a power supply voltage of the DC power supply E1 that is input from the input/output terminals IO11 and IO12, and outputs the transformed voltage from the input/output terminals IO21 and IO22. The DC-DC converter 1 also transforms a power supply voltage of the DC power supply E2 that is input from the input/output terminals IO21 and IO22, and outputs the transformed voltage from the input/output terminals IO11 and IO12. That is, the DC-DC converter 1 is capable of bidirectional power transfer.

The DC-DC converter 1 includes a first full-bridge circuit 10, a second full-bridge circuit 20, and a transformer T.

The transformer T includes a first winding n1 and a second winding n2. The first and second windings n1 and n2 are magnetically coupled to each other. The first winding n1 is connected to the input/output terminals IO11 and IO12 via the first full-bridge circuit 10. The second winding n2 is connected to the input/output terminals IO21 and IO22 via the second full-bridge circuit 20.

The first full-bridge circuit 10 includes a first leg in which switching elements Q11 and Q12 are connected in series, and a second leg in which switching elements Q13 and Q14 are connected in series. The switching elements Q11, Q12, Q13, and Q14 are one example of first, second, third, and fourth switching elements according to the present invention.

The first winding n1 of the transformer T is connected to the midpoint of each of the first and second legs. An inductor L1 is provided between the first winding n1 of the transformer T and the midpoint of the first leg. Note that the inductor L1 may be connected in series with either the first winding n1 or the second winding n2, and the location of the inductor L1 may be appropriately changed. For example, the inductor L1 may be provided between the first winding n1 and the midpoint of the second leg. The inductor L1 may be a discrete device or a leakage inductance of the transformer T, or a combination of a discrete device and a leakage inductance.

The switching elements Q11, Q12, Q13, and Q14 are connected in parallel with diodes D11, D12, D13, and D14 and capacitors C11, C12, C13, and C14. The switching elements Q11 to Q14 are MOS-FETs. Alternatively, the switching elements Q11 to Q14 may be other transistors such as IGBTs or JFETs. The diodes D11 to D14 may be discrete devices or parasitic diodes. Each of the capacitors C11 to C14 may be a discrete device or a parasitic capacitance, or a combination of a discrete device and a parasitic capacitance.

The second full-bridge circuit 20 includes a third leg in which switching elements Q21 and Q22 are connected in series, and a fourth leg in which the switching elements Q23 and Q24 are connected in series. The switching elements Q21, Q22, Q23, and Q24 are one example of fifth, sixth, seventh, and eighth switching elements according to the present invention.

The second winding n2 of the transformer T is connected to the midpoint of each of the third and fourth legs. The aforementioned inductor L1 may be provided between the second winding n2 and the midpoint of the third or fourth leg.

The switching elements Q21, Q22, Q23, and Q24 are connected in parallel with diodes D21, D22, D23, and D24 and capacitors C21, C22, C23, and C24. The switching elements Q21 to Q24 are MOS-FETs. Alternatively, the switching elements Q21 to Q24 may be other transistors such as IGBTs or JFETs. The diodes D21 to D24 may be discrete devices or parasitic diodes. Each of the capacitors C21 to C24 may be a discrete device or a parasitic capacitance, or a combination of a discrete device and a parasitic capacitance.

Gate terminals of the switching elements Q11 to Q14 and Q21 to Q24 are each connected to a control circuit 30. The control circuit 30 controls the switching of each of the switching elements Q11 to Q14, Q21 to Q24 so that the output power of the DC-DC converter 1 becomes set target power. In the present embodiment, the control circuit 30 implements soft switching of each of the switching elements Q11 to Q14 and Q21 to Q24 in order to reduce switching losses.

2. Soft Switching Operations

Soft switching operations of the switching elements Q11 to Q14 and Q21 to Q24 will be described hereinafter.

The DC-DC converter 1 transfers power from either the input/output terminals IO11, IO12 or the input/output terminals IO21, IO22 to the other, or vice versa. The following description is given on the assumption that the input/output terminals IO11 and IO12 are on the input side and the input/output terminals IO21 and IO22 are on the output side.

Figure 2:
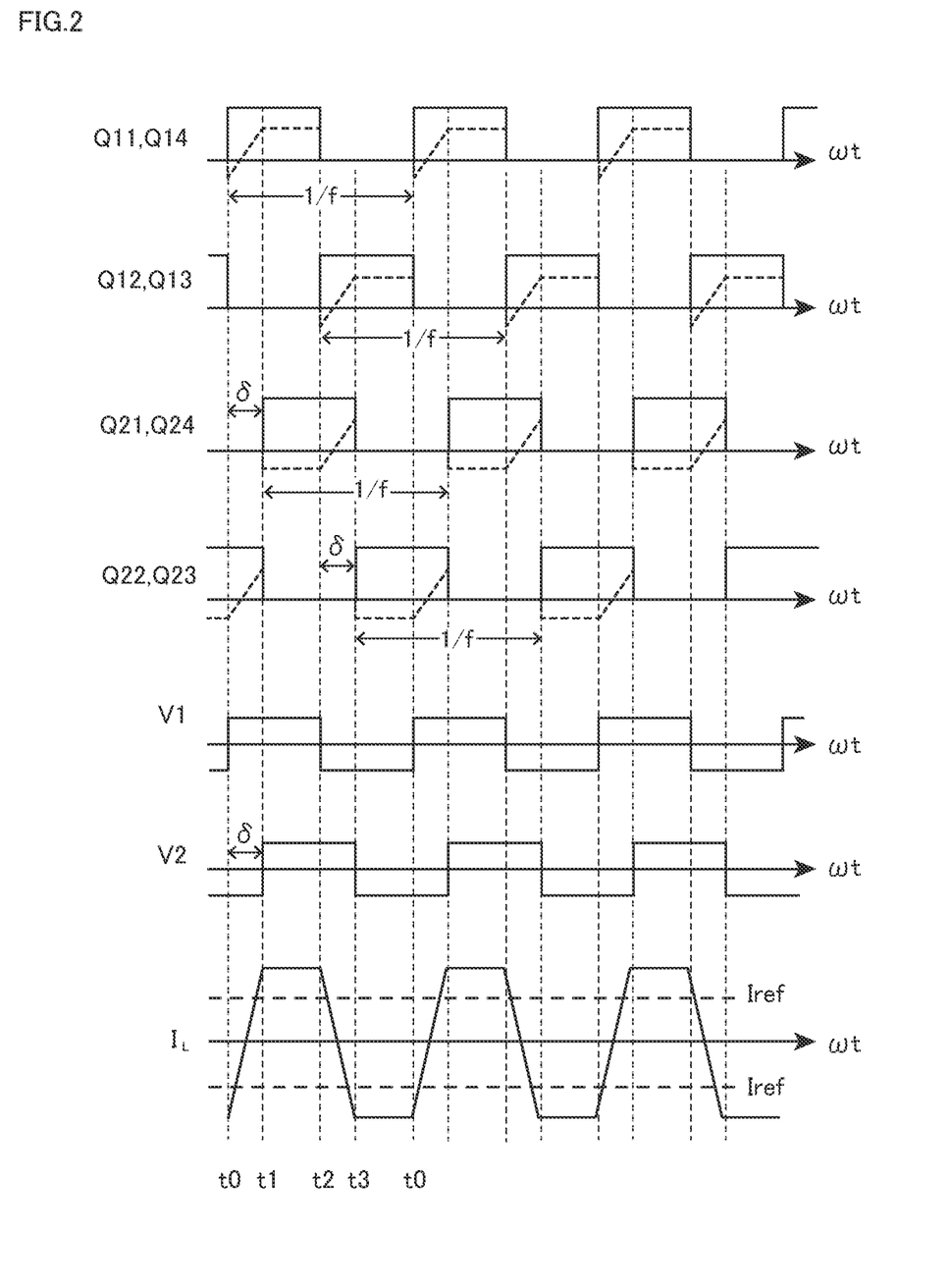
FIG. 2 is a timing chart illustrating turn-on and turn-off of each switching element.
Figure 3A:
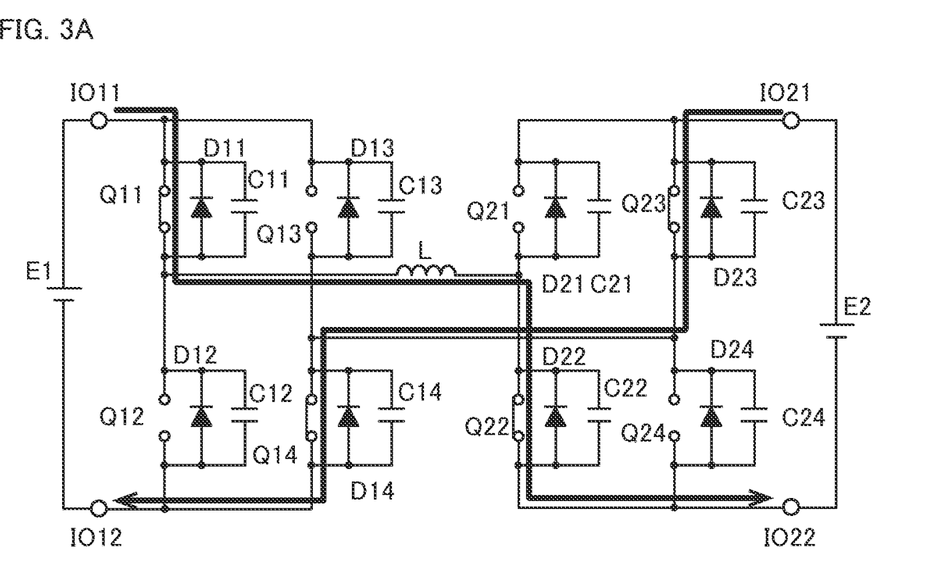
FIGS. 3A and 3B are diagrams for describing current paths in the DC-DC converter.
Figure 3B:
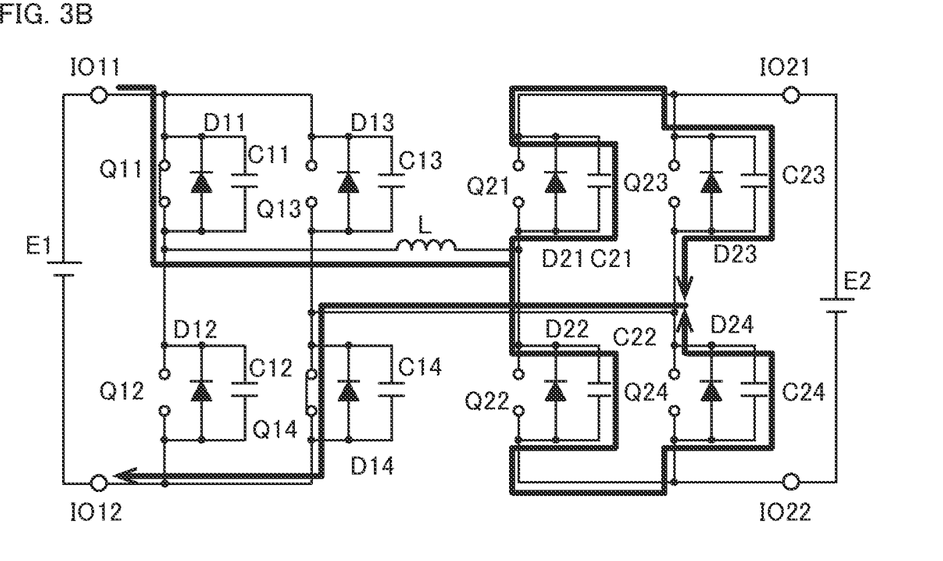
Figure 4A:
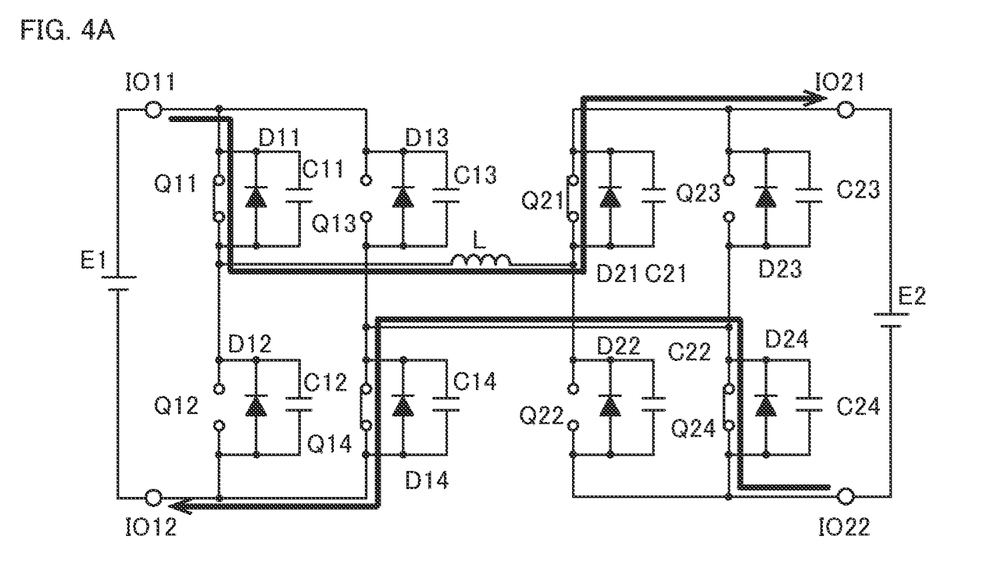
FIGS. 4A and 4B are diagrams for describing current paths in the DC-DC converter.
Figure 4B:
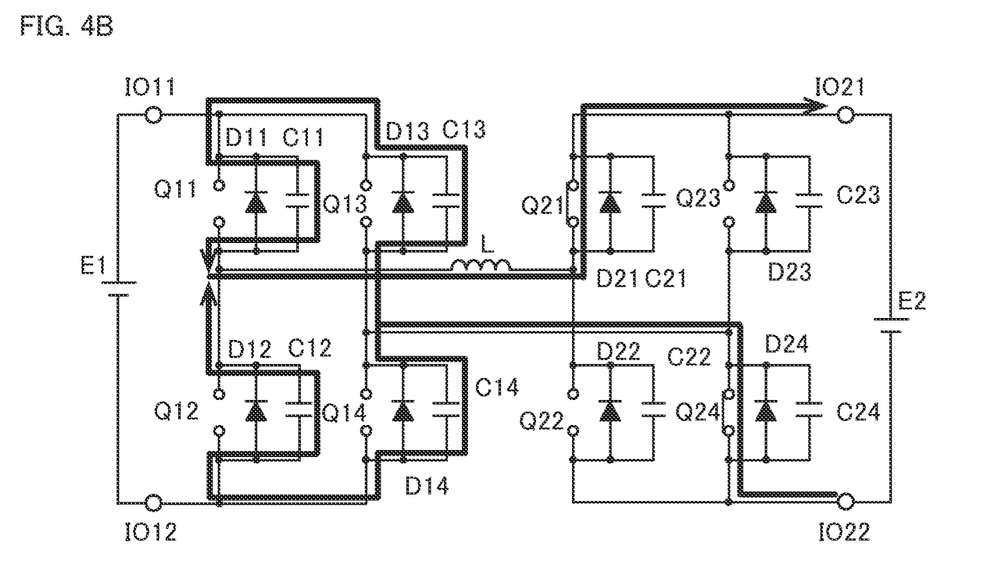
Figure 5:
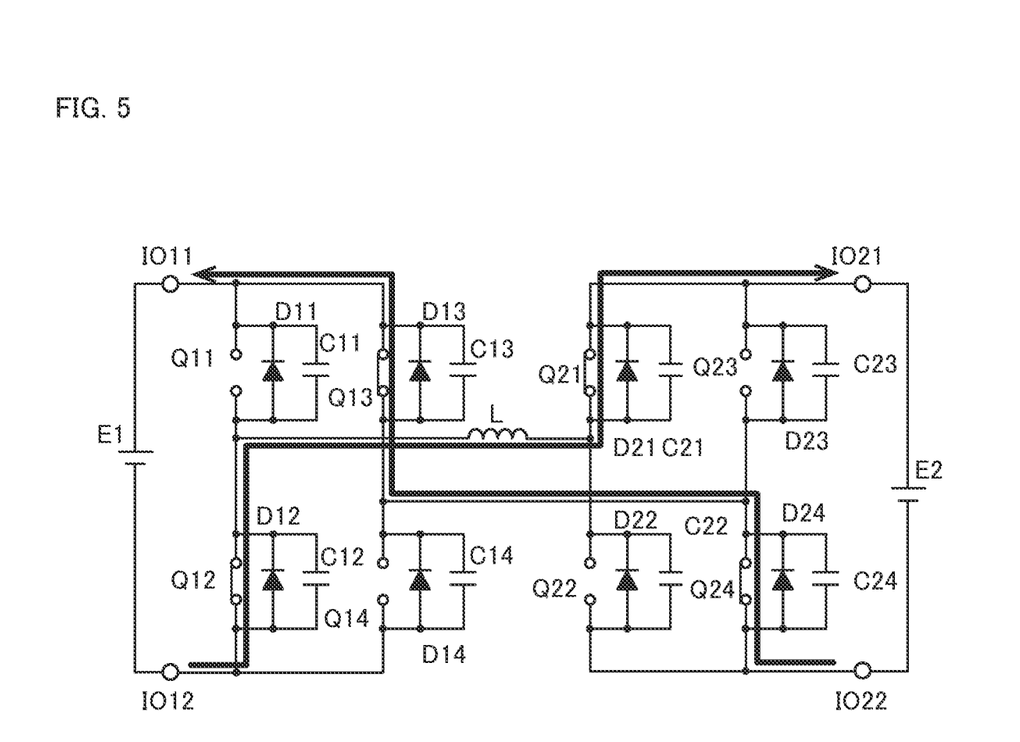
FIG. 5 is a diagram for describing a current path in the DC-DC converter.

FIG. 2 is a timing chart illustrating turn-on and turn-off of each of the switching elements Q11 to Q14 and Q21 to Q24. FIGS. 3, 4, and 5 are diagrams for describing current paths in the DC-DC converter 1. In FIGS. 3 to 5, the inductor L1 and the transformer T in FIG. 1 are illustrated as an equivalent inductor L. This inductor L is one example of an inductance component according to the present invention. In FIGS. 3 to 5, each switching element is indicated by a simplified graphical symbol.

In FIG. 2, V1 is a potential difference between the midpoint between the switching elements Q11 and Q12 and the midpoint between the switching elements Q13 and Q14 in FIG. 1, V2 is a potential difference between the midpoint between the switching elements Q21 and Q22 and the midpoint between the switching elements Q23 and Q24, and $I_L$ is the current flowing through the inductor L. In FIG. 2, the DC power supplies E1 and E2 are assumed to supply the same power supply voltage. That is, V1(t1)=V2(t2). In FIG. 2, the solid-line waveforms for the switching elements Q11 to Q14 and Q21 to Q24 represent the waveforms of source-drain voltages, and the broken-line waveforms therefor represent the waveforms of drain currents.

The control circuit 30 alternately turns on and off the switching elements Q11, Q14 and the switching elements Q12, Q13 in the first full-bridge circuit 10 at a switching frequency f (cycle of 1/f), while providing a dead time (first dead time) in between. The control circuit 30 also alternatively turns on and off the switching elements Q21, Q24 and the switching elements Q22, Q23 in the second full-bridge circuit 20 at the switching frequency f, while providing a dead time (second dead time) in between.

The control circuit 30 also creates a phase difference δ at the timing of switching between the first full-bridge circuit 10 and the second full-bridge circuit 20. That is, the switching elements Q11, Q14 and the switching elements Q21, Q24 have a phase difference δ, and the switching elements Q12, Q13 and the switching elements Q22, Q23 have a phase difference δ as illustrated in FIG. 2. As a result, the voltages V1 and V2 also have a phase difference δ.

Period from t0 to t1

In the period from t0 to t1, the switching elements Q11, Q14 and the switching elements Q22, Q23 are ON, and the switching elements Q12, Q13 and the switching elements Q21, Q24 are OFF. In this case, current flows in order from the DC power supply E1 to the switching element Q11, the inductor L, the switching element Q22, the DC power supply E2, the switching element Q23, and the switching element Q14 as illustrated in FIG. 3A. The power supply voltages of the DC power supplies E1 and E2 are applied to the inductor L. That is, the inductor current $I_L$ increases as illustrated in FIG. 2.

At timing t1, the switching elements Q22 and Q23 are turned off, and the switching elements Q21 and Q24 are turned on. At this time, due to the presence of the dead time, all of the switching elements Q21 to Q24 are OFF during the dead time. At this time, the inductor current $I_L$ continues to flow through the inductor L due to the nature of the inductor L. Therefore, current flows through a path from the inductor L to the capacitor C21, the capacitor C23, and the switching element Q14 and through a path from the inductor L to the capacitor C22, the capacitor C24, and the switching element Q14 as illustrated in FIG. 3B.

Accordingly, the capacitors C22 and C23 are charged, and the capacitors C21 and C24 are discharged. Here, the time until the charging and discharging of the capacitors C21 to C24 are completed is determined by the inductor current $I_L$ and the capacitances of the capacitors C21 to C24. If the charge time of the capacitors C22 and C23 is longer than the turn-off time of the switching elements Q22 and Q23, the turn-off of the switching elements Q22 and Q23 is implemented by soft switching.

After the discharging of the capacitors C21 and C24 has been completed, the diodes D21 and D24 are turned on. That is, the drain-source voltages of the switching elements Q21 and Q24 are zero. If the switching elements Q21 and Q24 are turned on at this time, this turn-on is implemented by ZVS.

Period from t1 to t2

In the period from t1 to t2, the switching elements Q11 and Q14 and the switching elements Q21 and Q24 are ON, and the switching elements Q12 and Q13 and the switching elements Q22 and Q23 are OFF. In this case, current flows in order from the DC power supply E1 to the switching element Q11, the inductor L, the switching element Q21, the DC power supply E2, the switching element Q24, and the switching element Q14 as illustrated in FIG. 4A. That is, the DC power supply E1 is discharged, and the DC power supply E2 is charged.

At timing t2, the switching elements Q11 and Q14 are turned off, and the switching elements Q12 and Q13 are turned on. At this time, all of the switching elements Q11 to Q14 are OFF during the dead time in the same manner as described with the switching elements Q21 to Q24. Since the inductor current $I_L$ continues to flow through the inductor L, current flows through a path from the inductor L to the switching element Q21, the DC power supply E2, the switching element Q24, the capacitor C14, the capacitor C12, and the inductor L and through a path from the inductor L to the switching element Q21, the DC power supply E2, the switching element Q24, the capacitor C13, the capacitor C11, and the inductor L as illustrated in FIG. 4B.

Accordingly, the capacitors C11 and C14 are charged, and the capacitors C12 and C13 are discharged. As described previously, if the charge time of the capacitors C11 and C14 is longer than the turn-off time of the switching elements Q11 and Q14, the turn-off of the switching elements Q11 and Q14 is implemented by soft switching.

After the discharging of the capacitors C12 and C13 has been completed, the diodes D12 and D13 are turned on. That is, the drain-source voltages of the switching elements Q12 and Q13 are zero. If the switching elements Q12 and Q13 are turned on at this time, the ZVS of the switching elements Q12 and Q13 is accomplished.

Period from t2 to t3

In the period from t2 to t3, the switching elements Q12 and Q13 and the switching elements Q21 and Q24 are ON, and the switching elements Q11 and Q14 and the switching elements Q22 and Q23 are OFF. In this case, as illustrated in FIG. 5, current flows in order from the DC power supply E1 to the switching element Q12, the inductor L, the switching element Q21, the DC power supply E2, the switching element Q24, and the switching element Q13. That is, the DC power supplies E1 and E2 are charged. The power supply voltages of the DC power supplies E1 and E2 are applied to the inductor L in the opposite direction to the direction in the case of FIG. 3A, and the inductor current $I_L$ decreases as illustrated in FIG. 2.

Period from t3 to t0

The period from t3 to t0 can be described in the same manner as the operation in the period from t1 to t2. At timing t3, the switching elements Q21 and Q24 are turned off by ZVS, and the switching elements Q22 and Q23 are turned on by ZVS. At timing t0, the switching elements Q11 and Q14 are turned on by ZVS, and the switching elements Q12 and Q13 are turned off by ZVS.

As described above, in the DC-DC converter 1, each of the switching elements Q11 to Q14 and Q21 to Q24 can be turned on and off by ZVS. This reduces switching losses and suppresses a reduction in the efficiency of power transfer.

3. Conditions for ZVS at Turn-On

Hereinafter, conditions for accomplishing ZVS will be described in detail.

3.1. Conditions for Inductor Current $I_L$

As described above, for example if the drain-source voltages of the switching elements Q11 to Q14 targeted for switching become zero after the capacitors C11 to C14 are charged or discharged by the inductor L during the dead time at timing t2, the switching elements Q11 to Q14 can be turned on and off by ZVS. That is, the ZVS of the switching elements Q11 to Q14 can be accomplished if the energy of the inductor L is at least greater than or equal to the total energy stored in the capacitors C11 to C14.

The aforementioned condition is satisfied if Expression (1) below holds true:

$$\tfrac{1}{2} L I_L^2 \geq \tfrac{1}{2} \cdot 4 C V x^2 \quad (1)$$

where L is the inductance of the inductor L, C is the capacitance of each of the capacitors C11 to C14, and Vx is the power supply voltage of the DC power supply E1 (see FIG. 1). Expression 1 is converted into Expression 2 below. In Expression 2, α is a correction coefficient that is set to an appropriate value as necessary. Assume that α=1 in the following description.

$$I_L \geq \alpha \cdot V x \sqrt{\frac{4C}{L}} \quad (2)$$

In Expression 2, $\alpha \cdot V x \sqrt{(4C/L)}$ represents a threshold current $I_{ref}$. If $|I_L| \geq |I_{ref}|$ during the dead time at timing t2 and at timing t0, the ZVS of each of the switching elements Q11 to Q14 becomes possible.

FIG. 2 illustrates the waveforms when Vx=Vy. Since V1(t1)=V2(t2), the inductor current $I_L$ at timing t1 is equal to the inductor current $I_L$ at timing t2, and the inductor current $I_L$ at timing t3 is equal to the inductor current $I_L$ at timing t0. Therefore, if $|I_L| \geq |I_{ref}|$ at timing t0 and at timing t2, $|I_L| \geq |I_{ref}|$ also holds true during the dead time at timing t1 and at timing t3. Accordingly, the ZVS of the switching elements Q21 to Q24 also becomes possible.

In contrast, when Vx≠Vy, i.e., V1(t1)≠V2(t2), more specifically when V1(t1)>V2(t2) or when V1(t1)<V2(t2), a potential difference between the voltages V1 and V2 is applied to the inductor L. Thus, the inductor current $I_L$ at timing t1 is different from the inductor current $I_L$ at timing t2. Also, the inductor current $I_L$ at timing t3 is different from the inductor current $I_L$ at timing t0.

Figure 6A:
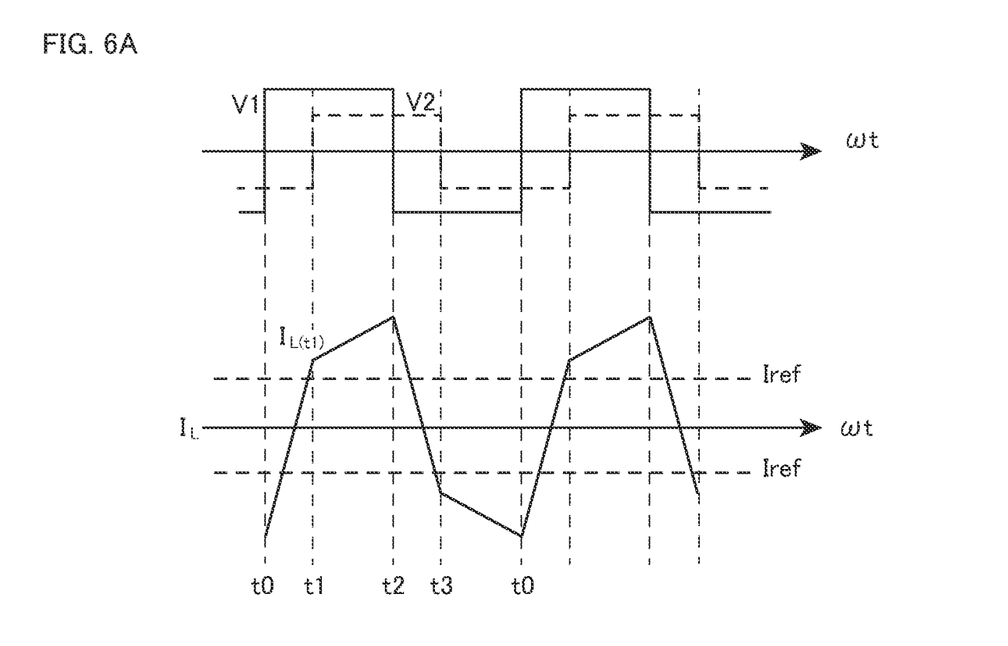
FIGS. 6A and 6B illustrate the waveform of an inductor current when $V1(t1) \neq V2(t2)$.
Figure 6B:
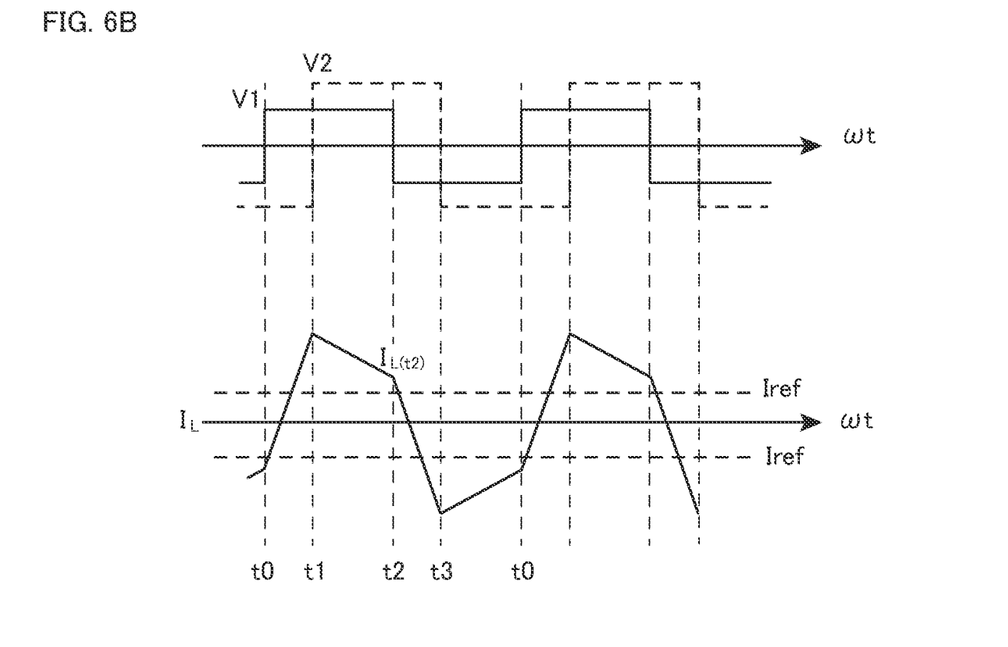

FIGS. 6A and 6B illustrate the waveforms of the inductor current $I_L$ when V1(t1)≠V2(t2). FIG. 6A illustrates the waveform of the inductor current $I_L$ when V1(t1)>V2(t2), and FIG. 6B illustrates the waveform of the inductor current $I_L$ when V1(t1)<V2(t2).

When V1(t1)>V2(t2), the inductor current $I_L$ at timing t1 (hereinafter, referred to as $I_{L(t1)}$) is smaller than the inductor current $I_L$ at timing t2 as illustrated in FIG. 6A. In this case, if $|I_{L(t1)}| \geq |I_{ref}|$ is satisfied, the ZVS of the switching elements Q11 to Q14 and Q21 to Q24 becomes possible.

When V1(t1)<V2(t2), the inductor current $I_L$ at timing t2 (hereinafter, referred to as $I_{L(t2)}$) is smaller than the inductor current $I_L$ at timing t1 as illustrated in FIG. 6B. In this case, if $|I_{L(t2)}| \geq |I_{ref}|$ is satisfied, the ZVS of the switching elements Q11 to Q14 and Q21 to Q24 becomes possible.

As described above, the ZVS of the switching elements Q11 to Q14 and Q21 to Q24 becomes possible if appropriate settings are made so as to pass the inductor current IL greater than or equal to the threshold current Iref through the inductor L, irrespective of the voltages Vx and Vy.

3.2. First Control and Second Control

The control circuit 30 controls the switching of the switching elements Q11 to Q14 such that the output power of the DC-DC converter 1 follows a set command value. In the case of performing switching control in accordance with the command value, the control circuit 30 switches between first control and second control and performs the first or second control in order to satisfy the above-described condition $|I_L| \geq |I_{ref}|$.

Power $P_T$ obtained in the process of causing the output power to follow the command value is expressed by Expression 3 below. In Expression 3, Vy is the power supply voltage (see FIG. 1) of the DC power supply E2, n is the turns ratio between the first winding n1 and the second winding n2. The power $P_T$ is hereinafter referred to as target power.

$$P_T = \frac{n \cdot V x \cdot V y}{\omega L} \delta \left(1 - \frac{\delta}{\pi}\right) \quad (3)$$

In Expression 3, ω is the drive angular frequency and ω=2πf as expressed by the aforementioned switching frequency f, and δ is the phase difference between the switching elements Q12, Q13 and the switching elements Q22, Q23, i.e., the phase difference between the voltage V1 and the voltage V2.

Figure 7:
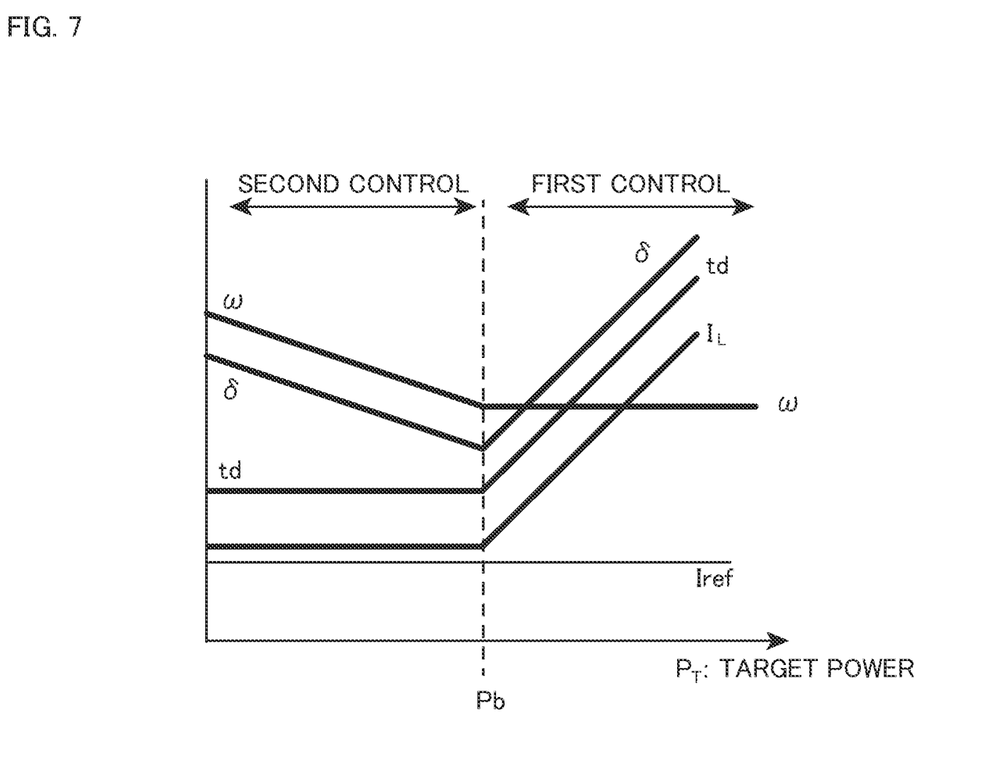
FIG. 7 is a diagram for describing first control and second control.

FIG. 7 is a diagram for describing the first control and the second control. The horizontal axis in FIG. 7 indicates the target power $P_T$. In FIG. 7, td is a time difference [μs] that is equivalent to the phase difference (δ in FIG. 2) between the voltages V1 and V2, and td=δ/ω=L·$I_L$/$V_x$.

As illustrated in FIG. 7, when the target power $P_T$ is greater than power Pb, the control circuit 30 performs the first control. In the first control, the control circuit 30 performs phase shift control for changing the phase difference δ while keeping the switching frequency f (drive angular frequency ω) constant.

Figure 8:
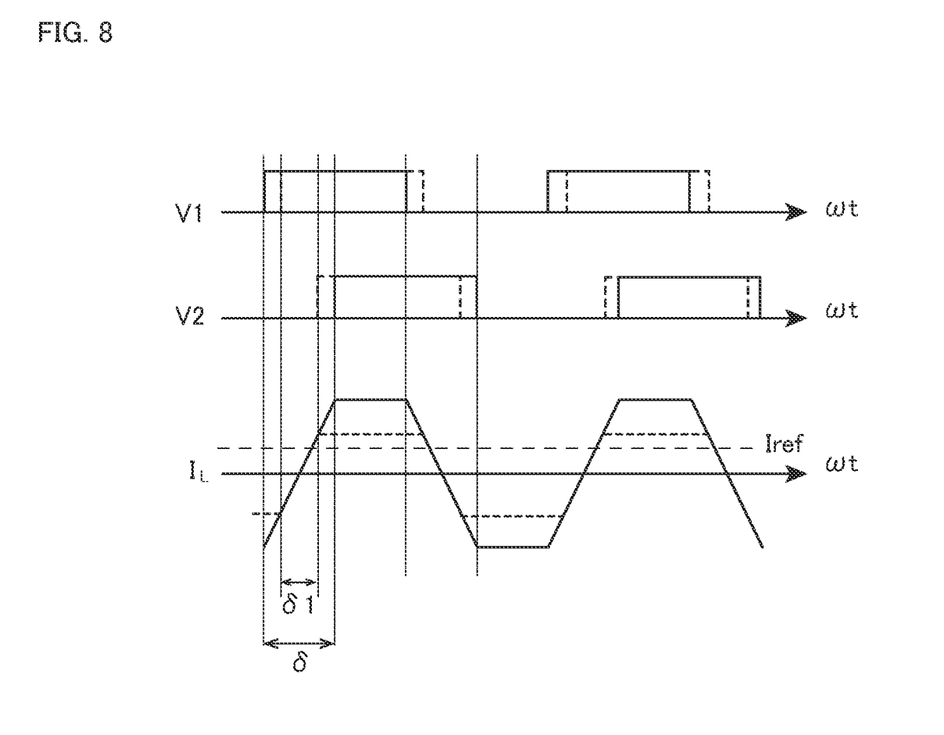
FIG. 8 illustrates the waveforms of voltages and the inductor current in the first control.

FIG. 8 illustrates the waveforms of the voltages V1 and V2 and the inductor current $I_L$ in the first control. The solid lines in FIG. 8 indicate the waveforms before a phase change, and the broken lines indicate the waveforms after the phase change. The phase after the phase change is expressed by δ1 (<δ).

As is apparent from Expression 3, the phase difference δ between the first full-bridge circuit 10 and the second full-bridge circuit 20 is changed in order to change the target power $P_T$. That is, in the case of lowering the target power $P_T$, the control circuit 30 reduces the phase difference δ between the first full-bridge circuit 10 and the second full-bridge circuit 20. In the case of raising the target power $P_T$, the control circuit 30 increases the phase difference δ between the first full-bridge circuit 10 and the second full-bridge circuit 20. Since td=δ/ω=L$I_L$/Vx, the time difference td and the inductor current $I_L$ also decrease with decreasing phase difference δ.

The power Pb is set such that, even in the above case, the inductor current $I_L$, which decreases with the phase difference δ, does not fall below the threshold current $I_{ref}$. That is, in the first control, the control circuit 30 changes the phase difference δ in a range in which the inductor current $I_L$ does not fall below the threshold current $I_{ref}$. Accordingly, the ZVS of the switching elements Q11 to Q14 and Q21 to Q24 becomes possible.

As illustrated in FIG. 7, when the target power $P_T$ is smaller than the power Pb, the control circuit 30 performs the second control. In the second control, the control circuit 30 performs frequency conversion control for changing the switching frequency f (drive angular frequency ω) while keeping the time difference td constant.

Figure 9:
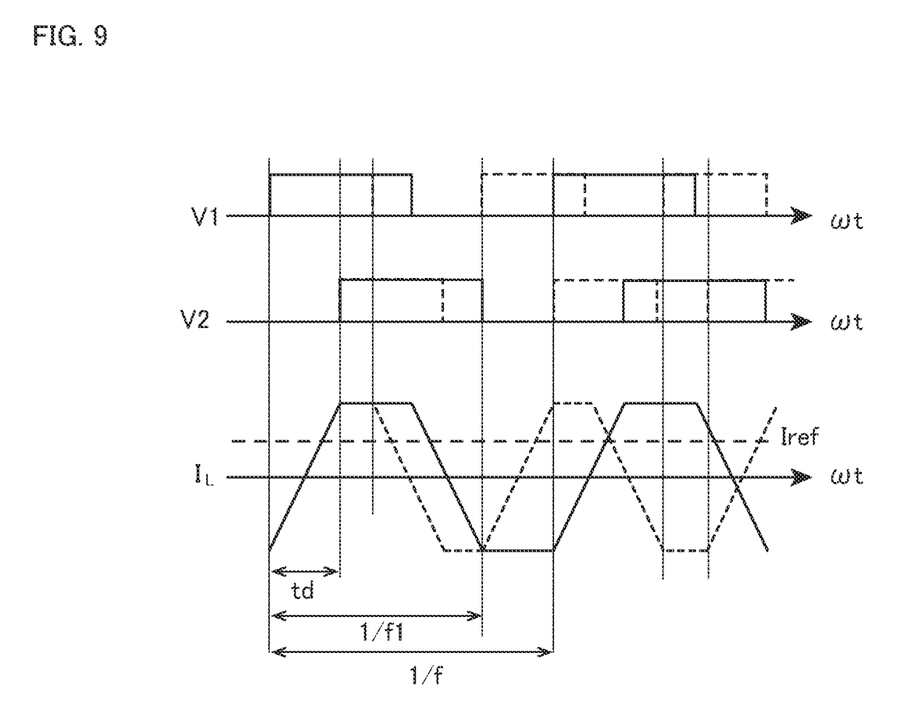
FIG. 9 illustrates the waveforms of the voltages and the inductor current in the second control.

FIG. 9 illustrates the waveforms of the voltages V1 and V2 and the inductor current $I_L$ in the second control. The solid lines in FIG. 9 indicate the waveforms before a frequency change, and the broken lines indicate the waveforms after the frequency change. The switching frequency after the frequency change is expressed by f1 (<f).

Since td=δ/ω, Expression 3 can be converted into Expression 4 below:

$$P_T = \frac{n \cdot Vx \cdot Vy}{L} td \left(1 - \frac{\omega td}{\pi}\right) \quad (4)$$

As is apparent from Expression 4, the drive angular frequency ω (i.e., switching frequency f) is changed in order to change the target power $P_T$. In order to reduce the target power $P_T$ from the power Pb, the drive angular frequency ω is increased. Since td=δ/ω=L$I_L$/Vx and td is kept constant, the phase difference δ also increases with increasing drive angular frequency ω. In this case, the inductor current $I_L$ remains constant without falling below the threshold current $I_{ref}$. Therefore, in the second control, |$I_L$|≥|$I_{ref}$| is maintained even if the switching frequency f is changed. Accordingly, the ZVS of the switching elements Q11 to Q14 becomes possible.

In the second control, the drive angular frequency ω is set by Expression 5 below:

$$\omega = \frac{\pi}{td}\left(1 - \frac{P_T \cdot L}{n \cdot Vx \cdot Vy \cdot td}\right) \quad (5)$$

As described above, by performing the first control or the second control depending on the target power $P_T$, the control circuit 30 can enlarge the area where ZVS can be performed. In particular, the first control is performed in the area where there is no need to change the switching frequency f. This suppresses heat generation in the inductor L (transformer T) or magnetic saturation, caused by a change in the switching frequency f.

4. Variations

While one embodiment of the present invention has been described thus far, the present invention is not intended to be limited to the above-described embodiment.

The above-described embodiment is explained, assuming that the input/output terminals IO11 and IO12 are on the input side and the input/output terminals IO21 and IO22 are on the output side. However, the DC-DC converter 1 is capable of bidirectional power transfer. Therefore, the input/output terminals IO11 and IO12 may be on the output side, and the input/output terminals IO21 and IO22 may be on the input side. This case can be described in the same manner as in the above-described embodiment, and therefore description thereof is omitted. Note that the DC-DC converter 1 does not necessarily have to be a bidirectional converter.

In the above-described embodiment, the switching frequency f is changed in the second control, but another third control may be performed. The third control employs a duty control method. For example, a phase difference between a drive signal for the switching elements Q11 and Q12 and a drive signal for the switching elements Q13 and Q14 is changed, or a phase difference between a drive signal for the switching elements Q21 and Q22 and a drive signal for the switching elements Q23 and Q24 is changed. Although the time difference td is kept constant in the second control, the time difference td may be caused to fluctuate.

Although in the above-described embodiment, the threshold current $I_{ref}$ is set to α·Vx√(4C/L), the value of the threshold current $I_{ref}$ is not limited to this and may be appropriately changed.

Each element in the above-described embodiment and variations may be combined appropriately within a range in which no contradictions arise.

While the invention has been shown and described in detail, the foregoing description is in all aspects illustrative and not restrictive. It is therefore to be understood that numerous modifications and variations can be devised without departing from the scope of the invention.

REFERENCE SIGNS LIST

1 DC-DC converter
10 First full-bridge circuit
20 Second full-bridge circuit
30 Control circuit
C11, C12, C13, C14 Capacitor
C21, C22, C23, C24 Capacitor
D11, D12, D13, D14 Diode D21, D22, D23, D24 Diode
E1 DC power supply
E2 DC power supply
IO11 Input/output terminal
IO12 Input/output terminal
IO21 Input/output terminal
IO22 Input/output terminal
L Inductor
L1 Inductor
Q11, Q12, Q13, Q14 Switching element
Q21, Q22, Q23, Q24 Switching element
T Transformer
Vx Power supply voltage
Vy Power supply voltage
V1 Voltage
V2 Voltage
n1 First winding
n2 Second winding

What is claimed is:

1. A converter with soft switching function, the converter comprising:
    a first full-bridge circuit including four switching elements, each switching element including either a capacitor that is a parasitic capacitance or an external capacitor connected in parallel;
    a second full-bridge circuit including four switching elements, each switching element including either a capacitor that is a parasitic capacitance or an external capacitor connected in parallel;
    a transformer including a first winding connected to the first full-bridge circuit and a second winding coupled magnetically to the first winding and connected to the second full-bridge circuit;
    an inductance component connected in series with the first or second winding; and
    a control circuit that performs soft switching control of each of the first full-bridge circuit and the second full-bridge circuit to cause output power to follow a command value,
    wherein the control circuit switches between first control for changing phases of a voltage on a first winding side and a voltage on a second winding side and second control for changing drive angular frequencies of the voltage on the first winding side and the voltage on the second winding side, based on a target value obtained in a process of causing the output power to follow the command value, so that an inductor current flowing through the transformer and the inductance component becomes larger than or equal to a threshold current at a timing of switching between turn-on and turn-off of each switching element,
    wherein the target value is a target power,
    wherein the control circuit performs the first control when the target power is greater than a threshold power, and performs the second control when the target power is less than the threshold power, and
    wherein the threshold power is set such that the inductor current does not fall below the threshold current in the first control.

2. The converter according to claim 1, wherein
    the first full-bridge circuit includes a first leg in which a first switching element and a second switching element are connected in series, and a second leg in which a third switching element and a fourth switching element are connected in series,
    the second full-bridge circuit includes a third leg in which a fifth switching element and a sixth switching element are connected in series, and a fourth leg in which a seventh switching element and an eighth switching element are connected in series, and
    in the first control, the control circuit changes phases of a drive signal for the first to fourth switching elements and a drive signal for the fifth to eighth switching elements, and in the second control, the control circuit changes switching frequencies of the first to eighth switching elements.

3. The converter according to claim 1, wherein
    a time difference that corresponds to a phase difference between the voltage on the first winding side and the voltage on the second winding side satisfies the following expression:

$$td=\delta/\omega$$

where td is the time difference, $\delta$ is the phase difference, and $\omega$ is the drive angular frequency.

4. The converter according to claim 3, wherein the time difference td is constant in the second control.

5. The converter according to claim 1, wherein
    the first full-bridge circuit is connected to a first direct-current power supply,
    the second full-bridge circuit is connected to a second direct-current power supply, and
    the following expression is satisfied:

$$\omega=\pi/td(1-(P_T \cdot L)/(n \cdot Vx \cdot Vy \cdot td))$$

where $P_T$ is the target value, $\omega$ is a switching frequency, Vx is a power supply voltage of the first direct-current power supply, Vy is a power supply voltage of the second direct-current power supply, L is an inductance of the transformer and the inductance component, td is a time difference, and n is a turns ratio of the transformer.

6. The converter according to claim 1,
    wherein the first full-bridge circuit includes a first leg in which a first switching element and a second switching element are connected in series, and a second leg in which a third switching element and a fourth switching element are connected in series,
    wherein the second full-bridge circuit includes a third leg in which a fifth switching element and a sixth switching element are connected in series, and a fourth leg in which a seventh switching element and an eighth switching element are connected in series, and
    wherein, in the first control, the control circuit changes phases of a drive signal for the first to fourth switching elements and a drive signal for the fifth to eighth switching elements, and in the second control, the control circuit changes switching frequencies of the first to eighth switching elements,
    wherein time for maintaining the first and fourth switching elements on does not overlap with time for maintaining the second and third switching element on, and
    wherein time for maintaining the fifth and eighth switching elements on does not overlap with time for maintaining the sixth and seventh switching element on.

7. A converter with soft switching function, the converter comprising:
    a first bridge circuit including a first leg in which a first switching element and a second switching element are connected in series and a second leg in which a third switching element and a fourth switching element are connected in series, each of the first to fourth switching elements including either a capacitor that is a parasitic capacitance or an external capacitor connected in parallel;

a second bridge circuit including a third leg in which a fifth switching element and a sixth switching element are connected in series and a fourth leg in which a seventh switching element and an eighth switching element are connected in series, each of the fifth to eighth switching elements including either a capacitor that is a parasitic capacitance or an external capacitor connected in parallel;

a transformer including a first winding connected to a midpoint of each of the first and second legs, and a second winding coupled magnetically to the first winding and connected to a midpoint of each of the third and fourth legs;

an inductance component connected in series with the first or second winding; and a control circuit that performs soft switching control of the first to eighth switching elements to cause output power to follow a command value, wherein the control circuit switches between first control and third control for execution, wherein the first control is control for changing phases of a drive signal for the first to fourth switching elements and a drive signal for the fifth to eighth switching elements, based on a target value obtained in a process of causing the output power to follow the command value, so that an inductor current flowing through the transformer and the inductance component becomes larger than or equal to a threshold current at a timing of switching between turn-on and turn-off of each switching element, wherein the third control is control for changing a phase difference between a drive signal for the first and second switching elements and a drive signal for the third and fourth switching elements, or changing a phase difference between a drive signal for the fifth and sixth switching elements and a drive signal for the seventh and eighth switching elements, wherein the target value is a target power, wherein the control circuit performs the first control when the target power is greater than a threshold power, and performs the third control when the target power is less than the threshold power, and wherein the threshold power is set such that the inductor current does not fall below the threshold current in the first control.

8. The converter according to claim 7, wherein time for maintaining the first and fourth switching elements on does not overlap with time for maintaining the second and third switching element on, and wherein time for maintaining the fifth and eighth switching elements on does not overlap with time for maintaining the sixth and seventh switching element on.

9. A converter with soft switching function, comprising:

a first full-bridge circuit including four switching elements, each switching element including either a capacitor that is a parasitic capacitance or an external capacitor connected in parallel;

a second full-bridge circuit including four switching elements, each switching element including either a capacitor that is a parasitic capacitance or an external capacitor connected in parallel;

a transformer including a first winding connected to the first full-bridge circuit and a second winding coupled magnetically to the first winding and connected to the second full-bridge circuit;

an inductance component connected in series with the first or second winding; and a control circuit that performs soft switching control of each of the first full-bridge circuit and the second full-bridge circuit to cause output power to follow a command value, wherein the control circuit switches between first control and second control based on a target power obtained in a process of causing the output power to follow the command value, so that an inductor current flowing through the transformer and the inductance component becomes larger than or equal to a threshold current at a timing of switching between turn-on and turn-off of each switching element, wherein the first control is to change a phase difference of a voltage on a first winding side and a voltage on a second winding side, and wherein the second control is to change a drive angular frequency of the voltage on the first winding side and the voltage on the second winding side while keeping a ratio of the phase difference to the drive angular frequency constant.

10. The converter according to claim 9, wherein the control circuit performs the first control when the target power is greater than a threshold power, and performs the second control when the target power is less than the threshold power, and wherein the threshold power is set such that the inductor current does not fall below the threshold current in the first control.

\* \* \* \* \*